United States Patent
De Vos

(10) Patent No.: US 10,399,034 B2
(45) Date of Patent: Sep. 3, 2019

(54) CATALYST AND METHOD FOR REDUCING HEXAVALENT CHROMIUM CR(VI)

(71) Applicant: Bosal Emission Control Systems NV, Lummen (BE)

(72) Inventor: Yves De Vos, Zemst (BE)

(73) Assignee: Bosal Emission Control Systems NV, Lummen (BE)

( * ) Notice: Subject to any disclaimer, the term of this patent is extended or adjusted under 35 U.S.C. 154(b) by 0 days.

(21) Appl. No.: 15/098,453

(22) Filed: Apr. 14, 2016

(65) Prior Publication Data

US 2016/0303508 A1 Oct. 20, 2016

(30) Foreign Application Priority Data

Apr. 14, 2015 (EP) ..................... 15163557

(51) Int. Cl.
| | |
|---|---|
| *B01D 53/86* | (2006.01) |
| *B01J 21/06* | (2006.01) |
| *B01J 35/04* | (2006.01) |
| *H01M 8/04014* | (2016.01) |

(52) U.S. Cl.
CPC ........ *B01D 53/8665* (2013.01); *B01J 21/063* (2013.01); *B01J 35/04* (2013.01); *H01M 8/04014* (2013.01); *B01D 2255/20707* (2013.01); *B01D 2257/60* (2013.01); *B01D 2258/012* (2013.01); *B01D 2258/0208* (2013.01); *B01D 2259/4591* (2013.01)

(58) Field of Classification Search
CPC ..... B01D 53/8665; B01J 21/063; B01J 35/04; H01M 8/04014
See application file for complete search history.

(56) References Cited

U.S. PATENT DOCUMENTS

| | | | |
|---|---|---|---|
| 2007/0041881 A1* | 2/2007 | Voss | ..................... F01N 3/0222 422/177 |
| 2008/0168901 A1 | 7/2008 | Carolan et al. | |
| 2009/0104494 A1 | 4/2009 | Quadakkers et al. | |
| 2011/0275866 A1 | 11/2011 | Underwood et al. | |
| 2013/0341270 A1 | 12/2013 | Butters et al. | |
| 2014/0057184 A1 | 2/2014 | Pillai et al. | |

OTHER PUBLICATIONS

Extended European Search Report for EP Application No. 15163557.0 dated Oct. 19, 2015 (8 pages).

* cited by examiner

*Primary Examiner* — James A Fiorito
(74) *Attorney, Agent, or Firm* — Merchant & Gould P.C.

(57) ABSTRACT

The high temperature titanium-catalyst comprises a body, the body having a hot gas inlet and a hot gas outlet. The body comprises an array of titanium containing catalytic elements, wherein the array of titanium containing catalytic elements is arranged such that hot gas containing an amount of hexavalent chromium Cr(VI) may enter the body at the hot gas inlet, may pass through the array of titanium containing catalytic elements and may leave the body at the hot gas outlet. When the titanium-catalyst is in use, Cr(VI) in the hot gas containing an amount of Cr(VI) reacts with titanium oxide in a surface layer of the titanium containing catalytic elements, whereby the Cr(VI) is reduced to trivalent chromium Cr(III) thus reducing the amount of Cr(VI) in the hot gas containing an amount of Cr(VI).

20 Claims, 2 Drawing Sheets

CATALYST AND METHOD FOR REDUCING HEXAVALENT CHROMIUM CR(VI)

This application claims benefit of Serial No. 15163557.0, filed on 14 Apr. 2015 in the European Patent Office and which application is incorporated herein by reference. To the extent appropriate, a claim of priority is made to the above disclosed application.

The invention relates to a catalyst and method for reducing hexavalent chromium. More particularly, the invention relates to a titanium catalyst and method for reducing hexavalent chromium using titanium oxide.

Most high temperature application stainless steel alloys contain chromium. At high temperatures hexavalent chromium or Cr(VI) may form. Cr(VI) comes in gaseous form and is poisonous and may be carcinogenic when inhaled. Thus, Cr(VI) containing compounds leaving a system must be limited, not least due to legal requirements.

Cr(VI) may be reduced to solid and harmless trivalent chromium or Cr(III). In a known process this is done at room temperature using titanium oxide particles and UV radiation to enable a photo-induced reaction. Therein, Cr(VI) adsorbed at the $TiO_2$ particles in an aqueous solution and was photo-reduced to Cr(III).

There is a need for a catalyst and a method for reducing Cr(VI), independent of UV radiation. Especially, there is need for a catalyst and a method for reducing Cr(VI) in combination with a heat exchanger.

According to a first aspect of the present invention, there is provided a method for reducing hexavalent chromium Cr(VI) in a hot gas. The method comprises the steps of providing a hot gas containing an amount of Cr(VI) and guiding the hot gas containing an amount of Cr(VI) over a titanium oxide surface of a catalytic element. The catalytic element is a metallic titanium containing catalytic element, more preferably a catalytic element made of pure titanium or made of a titanium alloy. The method further comprises the step of letting Cr(VI) in the hot gas containing an amount of Cr(VI) react with the titanium oxide surface of the catalytic element, thereby reducing Cr(VI) to trivalent Chromium Cr(III), and thus forming a hot gas having a reduced amount of Cr(VI). The reducing reaction of Cr(VI) takes place at high temperatures, thus no UV radiation source or other activator or catalyst is required. High temperature is herein understood as a temperature well above room temperature. This temperature may vary, for example, depending on the temperature of the hot gas of a hot gas source used to perform the method according to the invention. For example, the temperature of hot gas leaving a heat exchanger may vary depending on the application of the heat exchanger. In addition, a temperature may also vary with respect to effectiveness of Cr(VI) reduction in the catalyst according to the invention. For example, depending on purity or composition of the titanium material of the catalytic elements Cr(VI) reduction may be most effective in different temperature ranges. In some preferred embodiments of the method according to the invention, the hot gas containing an amount of Cr(VI) or the titanium oxide surface of the metallic titanium containing catalytic element or preferably both, the hot gas containing an amount of Cr(VI) and the titanium oxide surface of the catalytic element have a temperature above 400 degree Celsius, preferably above 600 degree Celsius, more preferably above 750 degree Celsius. In some preferred embodiments of the method according to the invention, the temperature of the hot gas containing an amount of Cr(VI) or the titanium oxide surface of the catalytic element or both is below 1100 degree Celsius, preferably below 1000 degree Celsius, more preferably below 950 degree Celsius. In some preferred embodiments, the temperature is in a range between 500 and 1100 degree Celsius, more preferably in a range between 600 and 1000 degree Celsius, most preferably in a range between 700 and 950 degree Celsius or 750 and 950 degree Celsius.

Herein and in the following, the terms 'above' and 'below' are understood to explicitly also including and disclosing the respective boundary values.

Here and in the following, the term 'in a range between' is understood as explicitly also including and disclosing the respective boundary values.

While Cr(VI) is poisonous for the environment, Cr(VI) may also accelerate degradation of technical devices, for example, of a fuel cell or of components of a fuel cell. Components of fuel cells may, for example, be reformers or afterburners. Deposits in the fuel cell slow down catalytic reactions and a voltage of the fuel cell system is reduced over time. Such a voltage drop may be accelerated by the deposition of Cr(VI) in the fuel cell.

For reasons of energy efficiency and operation optimization, fuel cells, especially high temperature fuel cells such as, for example, high temperature solid oxide fuel cells (SOFCs), are often combined with heat exchangers. Heat gained in the exchanger may be used for preheating of a fluid then used in the fuel cell. Also, the energy in a warm or hot fluid leaving the fuel cell may be recuperated in a heat exchanger.

A heat exchanger contains steel components and has large surface areas. Thus, when heated to high temperatures, typically above 650 degree Celsius, Cr(VI) may form. Cr(VI) mainly forms $CrO_2(OH)_2$. This and other Cr(VI) compounds are then transported by the gas flow passing through the heat exchanger and would in conventional applications be led to the environment or to a fuel cell connected to the heat exchanger. According to the present invention, the Cr(VI) transported by the hot gas flow passing through the heat exchanger is now made to pass a metallic titanium oxide surface of a catalytic element or made to pass through a catalyst according to the invention, respectively. Thus, in some preferred embodiments of the method according to the invention, the step of providing a hot gas containing an amount of Cr(VI) comprises providing hot outlet gas of a heat exchanger. The so treated and purified hot gas—purified from Cr(VI)—may then be further transported, for example to the environment or to a fuel cell in fluid connection with the catalyst.

The problem of evaporated Cr(VI) is not limited to heat exchangers. It may also occur in any other chromium containing steel components, which are heated to high temperatures of typically above 650 degree Celsius, as for example may be the case in industrial applications.

By letting the Cr(VI) containing hot gas react with or get captured at a titanium oxide surface, further transport of Cr(VI) may be prevented or at least limited. In addition, with the method according to the invention, Cr(VI) reduction may directly be incorporated into a high temperature process, without requiring further activation energy or energy source for the chemical reaction to take place.

The term 'reduced amount' of Cr(VI) is herein understood as being an amount of Cr(VI), which is smaller than the amount of Cr(VI) in the hot gas before reacting with the titanium oxide surface of the catalytic element. 'Reduced amount' also includes an amount corresponding to zero or an amount, which is too small to be detected, respectively. The 'reduced amount' of Cr(VI) may basically be in any range between 0 percent and <100 percent of the amount of Cr(VI)

in the hot gas before being trapped on the titanium oxide surface of the catalytic element.

In some embodiments of the method according to the invention, the hot gas having a reduced amount of Cr(VI) compared to the hot gas having an amount of Cr(VI) has a reduced amount of Cr(VI), which reduced amount of Cr(VI) is reduced by at least 50 percent, preferably by at least 90 percent, more preferably by at least 99 percent, most preferably by at least 99.7 percent of the amount of Cr(VI) in the hot gas before the hot gas is treated in the titanium catalyst according to the invention. A Cr(VI) reduction may be very effective with the method and the catalyst according to the invention and may even completely remove the Cr(VI) content of hot gas treated in the catalyst.

In some preferred embodiments of the method according to the invention, the method comprises the step of guiding the hot gas having a reduced amount of Cr(VI) content into a fuel cell system, preferably into a high temperature fuel cell system such as for example a SOFC system. After that Cr(VI) in the Cr(VI) containing hot gas has been trapped by the titanium oxide surface of the catalytic element, the hot gas having passed the titanium oxide surfaces comprises a reduced amount of Cr(VI). This hot gas containing a reduced amount of Cr(VI) is then guided into the fuel cell system arranged downstream of the catalytic element. The fuel cell system may be a single fuel cell or a plurality of fuel cells, for example a fuel cell stack. The fuel cell system may, for example, also comprise further fuel cell components such as for example reformers or afterburners.

According to another aspect of the method according to the invention, the method comprises the further step of providing the catalytic element with a surface structure. Such a surface structure may be limited to the surface or a surface layer of the catalytic element. However, preferably, a surface structure is formed by the form of the catalytic element itself, for example by a corrugation of the catalytic element. Preferably, a surface structure is provided for enhancing a size of the titanium oxide surface of the catalytic element, thereby enhancing the catalytically active surface of the catalytic element. The surface structure may also be provided for supporting the spalling of flakes of a surface layer from the catalytic element. The titanium oxide layer on the catalytic element grows upon operation time of the catalytic element. Upon thermal expansion and contraction of the catalytic element, the rigid surface layer on the catalytic element tends to break and spall. A surface structure may support the spalling, as well as the formation of flakes. For example, under changing temperatures a corrugated sheet will expand and contract according to its corrugations similar as a bellow. The smaller the flakes, the more easy a removal of the flakes from between catalytic elements and from a catalyst. Smaller pieces of spalled parts are less prone to get stuck between catalytic elements and may more easily be transported for their removal, for example to a collection tray. Preferably, a transport of flakes is supported and performed by gravitational force and by the hot gas passing through the catalyst.

Preferably, a surface structure enhances the size of the titanium oxide surface of the catalytic elements and supports the spalling of flakes of a surface layer from the catalytic elements.

The formation of flakes that have spalled from the catalytic element is an effect, which may be desired in the catalyst and the method according to the invention. A growing surface layer on the catalytic element may define the operational lifetime of a catalyst. If a surface may be renewed or at least partly renewed after, for example, a few thousand operation hours, a lifetime of a catalyst may be prolonged. Thus, if the catalytic element comprises metallic titanium in the bulk material, for example is made of pure titanium (corresponding to 99 percent or higher zero-valent, metallic titanium) or of a titanium alloy, a pure titanium surface or a fresh titanium alloy surface of the catalytic element is presented after the spalling of the (used) surface layer of the catalytic element. Pure titanium bulk material provides the advantage of a very efficient Cr(VI) reduction material. However, pure titanium bulk material tends to produce surface layers, which spall rather fast. Generally, titanium alloys tend to build more stable surface layers such that a lifetime of the catalytic element and with this the lifetime of the catalyst may be extended using catalytic elements made of titanium alloys compared to pure metallic titanium. Examples of titanium alloys that may be used for the manufacture of catalytic elements according to the invention are titanium-nickel alloys, titanium-aluminum-vanadium alloys, or titanium alloys using molybdenum or tin and smaller amounts of carbon, nitrogen or iron. A titanium alloy may have a minimum percentage of zero-valent or metallic titanium of 70 weight percent of the alloys, preferably at least 80 or 90 percent titanium.

According to another aspect of the method according to the invention, the method further comprises the step of collecting flakes of a surface layer that has spalled from the catalytic element. Preferably, flakes are collected at a location offset from a path of the hot gas. By this, the collected flakes are not further transported along a flow path of the hot gas. This may reduce the risk of flakes getting into a device, for example a fuel cell, arranged further downstream of the catalytic element, possibly damaging said device.

The terms 'downstream' and 'upstream' are herein used to indicate a location or direction with respect to the hot gas passing the catalytic element or an array of catalytic elements as in the catalyst according to the invention.

While the method is described relating to a catalytic element, the hot gas is preferably led over the surface of a plurality of catalytic elements, preferably through or in between neighboring catalytic elements.

According to another aspect of the present invention, there is provided a high temperature titanium-catalyst. The catalyst comprises a body, the body has a hot gas inlet and a hot gas outlet. The body comprises an array of metallic titanium containing catalytic elements. The array of metallic titanium containing catalytic elements is arranged such that hot gas containing an amount of hexavalent chromium Cr(VI) may enter the body at the hot gas inlet, may pass through the array of metallic titanium containing catalytic elements and may leave the body at the hot gas outlet. When the titanium-catalyst is in use, Cr(VI) in the hot gas containing an amount of Cr(VI) reacts with titanium oxide in a surface layer of the titanium containing catalytic elements. Thereby, the Cr(VI) is reduced to trivalent chromium Cr(III) thus reducing the amount of Cr(VI) in the hot gas containing an amount of Cr(VI). Typically, the resulting reaction product is $Cr_2O_3$ covering $TiO_2$ of the surface layer of the catalytic elements.

The array of titanium containing catalytic elements provides large surface areas for the hot gas containing an amount of Cr(VI). This optimizes the reduction of Cr(VI) into Cr(III). The titanium containing catalytic elements not only comprise a titanium oxide surface but contain metallic titanium in the bulk material of the catalytic elements. Preferably, all or some of the catalytic elements are made of pure metallic titanium or of a titanium alloy. Preferably, the titanium content of the catalytic elements is at least 70 percent of metallic titanium.

Catalytic elements made of a metallic titanium containing material may facilitate the manufacturing of catalytic elements. The catalytic elements may be made, for example, formed or cut, out of a single material, preferably not requiring any further material treatment step. A titanium oxide surface layer for capturing Cr(VI) automatically forms upon operation of the catalyst. In addition, catalytic elements thoroughly made of a material containing metallic titanium may present fresh metallic titanium surface for further reaction with Cr(VI) as soon as a titanium oxide containing surface layer has spalled or has been made to spall. Thereby, a $Cr_2O_3$ scale formed on the titanium oxide layer is typically spalled together with the titanium oxide. Thus, a Cr(VI) reduction may be kept at an efficient level due to the reactive surface of the catalytic elements. In addition, the lifetime of the catalyst may be prolonged due to the generation of fresh catalytic surfaces of the same catalytic elements of the catalyst.

In some preferred embodiments of the catalyst according to the invention, the catalytic elements are made of corrugated sheet material.

According to an aspect of the catalyst according to the invention, the array of catalytic elements is a plurality of plates or tubes arranged in parallel. Plates or tubes may be arranged next to each other, preferably arranged in an equidistant manner, for example forming a stack of catalytic elements. Tubes may also be arranged concentrically. The provision of an array of catalytic elements is a space efficient way of manufacturing a catalyst. In addition, distances between individual catalytic elements may be chosen for an efficient catalytic reaction of the hot gas in the catalyst.

If the catalytic elements are provided with a surface structure, especially a regular arrangement of a surface structure, preferably, the catalytic elements are arranged such that the surface structures of neighboring catalytic elements are tilted against each other. For example, corrugated sheets or plates are preferably arranged such that corrugations of neighboring sheets or plates are tilted against each other. A tilting angle between neighboring catalytic elements or surface structures of neighboring elements, respectively, may, for example, be between 5 degree and 90 degree. A tilting of corrugations or surface structures against each other may prevent a "falling together" of neighboring catalytic elements and thereby prevent a closing of the hot gas path between the catalytic elements. Corrugations or other surface structures may also be aligned at an angle with the hot gas flow. Corrugations may for example be arranged at an angle between 0 degree and 90 degree, for example 30 degree or 45 degree and the direction of the hot gas flow. For example, if the hot gas passes the catalytic element in a longitudinal direction, the corrugations may be arranged at the given angles in view of the longitudinal direction.

According to another aspect of the catalyst according to the invention, the plates may be provided with perforations or holes for hot gas to pass through the perforations or holes. In such an embodiment, the plates are preferably arranged perpendicular or substantially perpendicular to a hot gas flow direction through the catalyst. This means that the plates are arranged to be approximately perpendicular to a longitudinal direction of the catalyst, for example within plus or minus 10 degrees of perpendicular to the longitudinal direction of the catalyst.

Preferably, perforations of neighboring plates are axially displaced such that a gas flow is made to change its flow direction and it passes the surface of the perforated plates before passing through the perforations of the neighboring downstream plate.

Preferably, plates are arranged to form a stack, which stack forms the core of the catalyst according to the invention. Several small stacks, or partial stacks, may be arranged distanced to each other to form the core of the catalyst according to the invention. A small stack may, for example, comprise 2 to 15 plates, preferably 3 to 10 plates, more preferably 4 to 8 plates. Preferably, the plates in each small stack are arranged equidistantly. Preferably, the several small stacks in a catalyst are arranged equidistantly.

Providing several small stacks in a catalyst may provide more flexibility in the composition and arrangement of identical or different catalytic elements. Such flexibility may be directed but is not limited to: Cr(VI) reduction capability, manufacturing process and material of the catalytic elements or back pressure in the hot gas passing through the catalyst.

Catalytic elements may also be balls or other individual small objects such as, for example, pellets, which may be provided in large amounts and may fill a catalytic volume of the catalyst. Preferably, a plurality of balls or pellets is arranged in one or several arrays in the catalyst. However, the balls or pellets may also be arranged randomly over a portion of the volume of the catalyst. Preferably, balls or pellets in a catalyst all have a same or substantially same size and preferably a same material composition. However, balls or pellets in a catalyst may also have different sizes or a different material composition or may have both a different size and a different material composition. Pellets typically have a longitudinal axis. They may, for example, be rod-shaped or disc-shaped with a circular or oval cross section. Preferably, pellets are aligned with their longitudinal axes arranged parallel or substantially parallel to each other. Balls of a same size are typically arranged in a closed packed manner, for example, hexagonal closed packed or cubic closed packed. A hot gas flow then flows into the catalyst via the hot gas inlet of the catalyst and through the interstices between the balls or pellets and out of the catalyst via the hot gas outlet of the catalyst.

According to a further aspect of the catalyst according to the invention, the catalyst further comprises a cavity for collecting flakes. The flakes are portions of a surface layer that have spalled from the titanium containing catalytic elements. Typically, flakes contain or are made of titanium oxide and chromiumtrioxide. A cavity may, for example, be arranged adjacent the array of catalytic elements, for example provided underneath the catalytic elements, such that flakes may fall into the cavity by gravitational force. A cavity may also be arranged at or extend over a downstream end of the catalytic elements. By this, flakes that are transported in the hot gas stream away from the catalytic elements and out of the array of catalytic elements may be collected in the cavity. Preferably, a cavity is incorporated into the body of the catalyst.

The hot gas inlet of the catalyst may be connected to a heat exchanger, preferably a hot gas heat exchanger outlet.

The hot gas outlet of the catalyst may be connected to a fuel cell system, preferably to an inlet of a fuel cell system, for example to a cathode inlet of the fuel cell system.

According to the invention there is also provided a system comprising the catalyst according to the invention and as described herein, wherein the hot gas inlet of the catalyst is connected to a heat exchanger, or wherein the hot gas outlet of the catalyst is connected to a fuel cell system, or wherein the hot gas inlet of the catalyst is connected to a heat exchanger and the hot gas outlet of the catalyst is connected to a fuel cell system.

Advantages and further aspects of the catalyst according to the invention have been described relating to the method according to the invention and will therefore not be repeated.

Preferably, the hot gas is hot air, but may also be hot exhaust gas from an engine or industrial installation.

Preferably, the method for reducing hexavalent chromium and the high-temperature titanium catalyst both according to the invention and as described herein are used in a power system of a vehicle or an exhaust system, for example of an engine, such as a diesel engine or are used in an energy generation and conversion system for domestic or industrial applications.

The invention is further described with regard to an embodiment, which is illustrated by means of the following drawings. Wherein FIG. 1 shows a high temperature titanium catalyst with an array of titanium containing corrugated plates;

In the figures, the same reference numbers are used for the same or similar elements.

Figure 1:
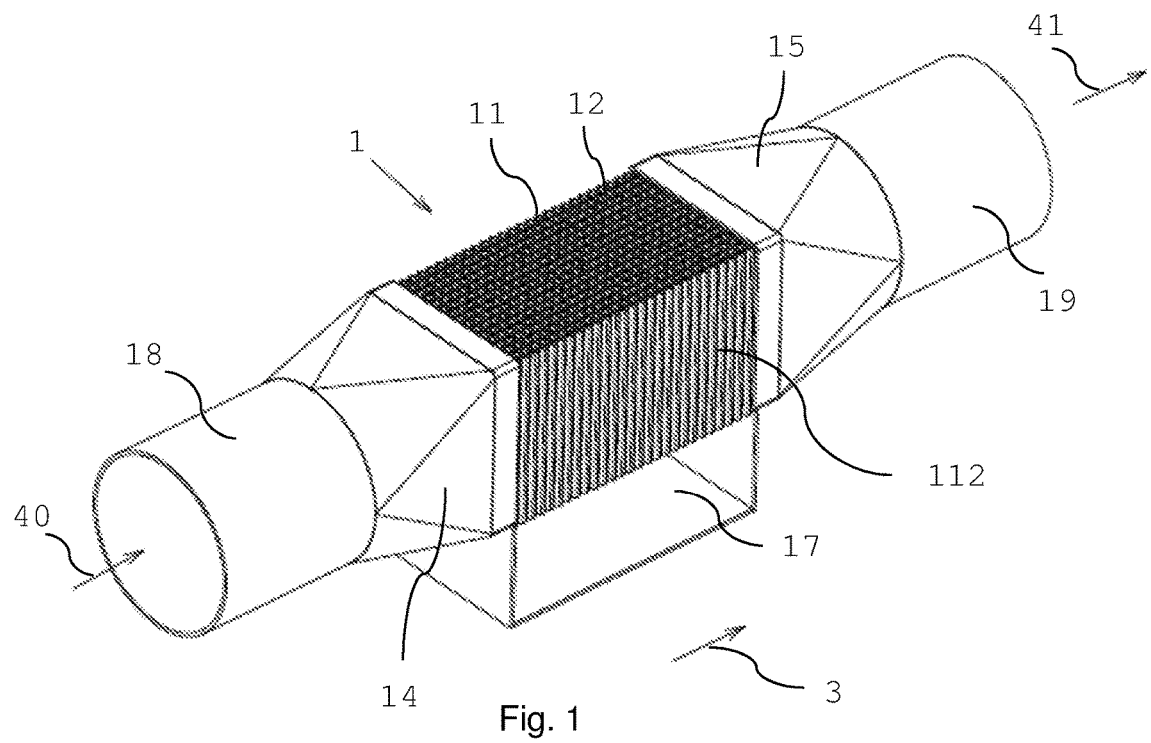

In FIG. 1 the body 10 of the titanium catalyst 1 has been cut open to view the array of catalytic elements in the form of corrugated plates 11,12. Preferably, the corrugated plates are made of metallic titanium or of a titanium alloy. The array of corrugated plates 12,13 form a stack, which are arranged in a catalytic volume of the body 10 of the catalyst 1. Neighboring plates 12,13 in the stack have corrugations 112, which are rotated against each other by 90 degrees. In the embodiment shown in FIG. 1 the corrugations 112 of neighboring plates are arranged vertically and horizontally, as well as parallel and perpendicular to a hot gas main flow direction. The hot gas main flow direction is indicated by arrow 3.

A hot gas inlet of the stack is arranged at the upstream end of the catalyst 1. A hot gas outlet of the stack is arranged at the downstream end of the catalyst 1. Inlet and outlet are both provided with an interface 14,15. With the inlet interface 14 the catalyst 1 may be connected via tubing 18 to a hot gas source, which may, for example, be a heat exchanger. The inlet interface 14 also serves to distribute the hot gas, preferably uniformly, to the entire stack of plates 11,12. With the outlet interface 15, the catalyst 1 may be connected via tubing 19 to a receiving location, receiving the catalytically treated hot gas containing no or only low Cr(VI) content. A receiving location may, for example, be the environment or a receiving device such as, for example, a fuel cell. The outlet interface 15 also serves to collect the catalytically treated hot gas from the stack.

A cavity 17 is arranged beneath the stack of catalytic elements. The cavity 17 may directly be formed by the body and serves as collection tray. The body 10 then has a volume comprising the volume of the stack and of the cavity 17. In the embodiment shown in FIG. 1, the cavity 17 extends over a length of the plates 11,12. However, the cavity 17 may also extend further downstream, for example including some or the entire length of the interface 15. By this, flakes produced in the catalyst 1 and transported in a downstream direction by the hot gas will still be collected in the cavity 17 and not transported to a device possibly arranged further downstream of the catalyst 1.

A hot gas containing Cr(VI) 40 enters the body 10 and the stack of catalytic elements 11,12 at the hot gas inlet (left side of stack). The hot gas then passes between the corrugated plates 11,12 of the catalyst 1. Cr(VI) is adsorbed at the titanium oxide surface of the plates 11,12. Due to the high temperature of the hot gas, which may be higher than 700 degree Celsius, for example about 750 degree Celsius, Cr(VI) is very efficiently reduced to Cr(III). The hot gas preferably significantly or entirely depleted of Cr(VI) 41 leaves the stack at the hot gas outlet at the downstream end of the catalyst 1, passing also through the interface 15 and tubing 19.

Preferably, an amount of Cr(VI) is reduced by the catalyst 1 by a factor of 200 to 400 (corresponding to a remaining amount of Cr(VI) of 0.5 percent to 0.25 percent of the Cr(VI) in the hot gas entering the catalyst), for example by a factor of 300. For example, if the amount of Cr(VI) in the hot gas is 100 milligram per 1000 operating hours of the titanium catalyst, the reduced amount of Cr(VI) then is 0.3 milligram per 1000 operating hours.

Figure 2:
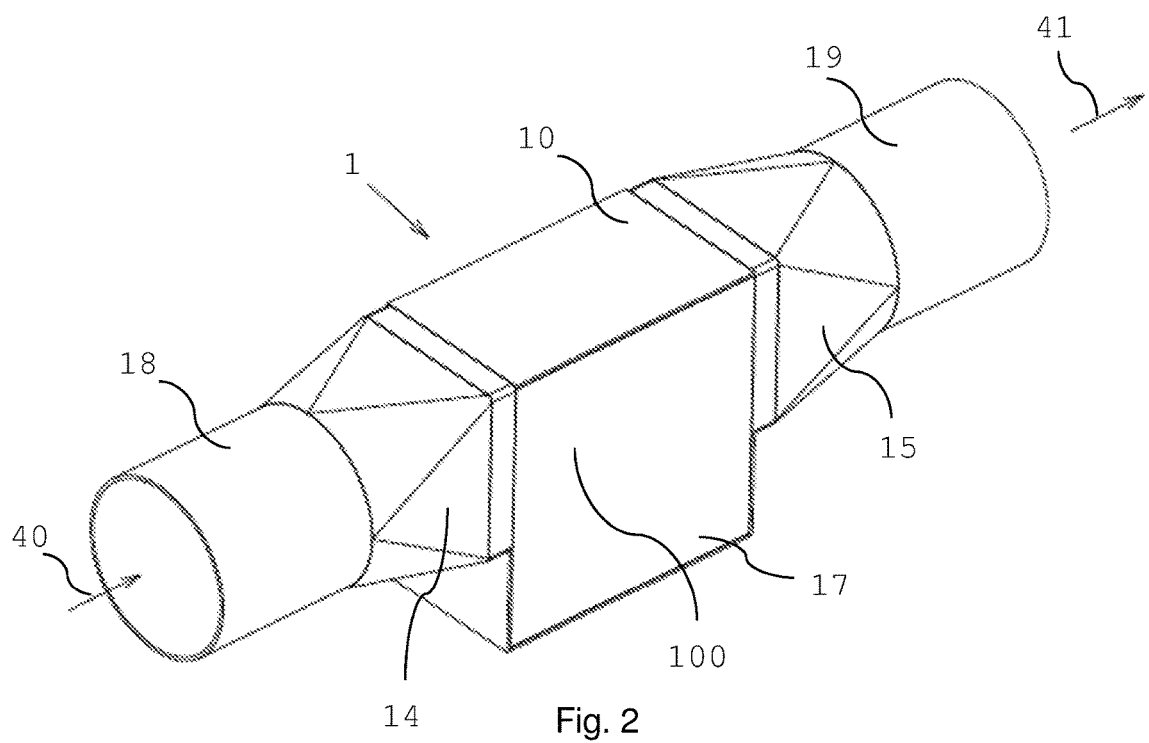
FIG. 2 shows a perspective view of a high temperature titanium catalyst, for example as shown in FIG. 1.

In FIG. 2 the catalyst body 10 comprises a cavity 17 arranged below the stack of catalytic elements, which stack may be constructed and arranged as shown in the embodiment of FIG. 1. The hot gas 41 having passed the catalyst 1 and containing no or a reduced amount of Cr(VI) leaves the catalyst 1 via its hot gas outlet to be led to, for example, an inlet of a fuel cell. The interfaces 14,15 as well as tubings 18,19 may be part of the catalyst 1 and manufactured and sold as unit.

Figures 3, 4:
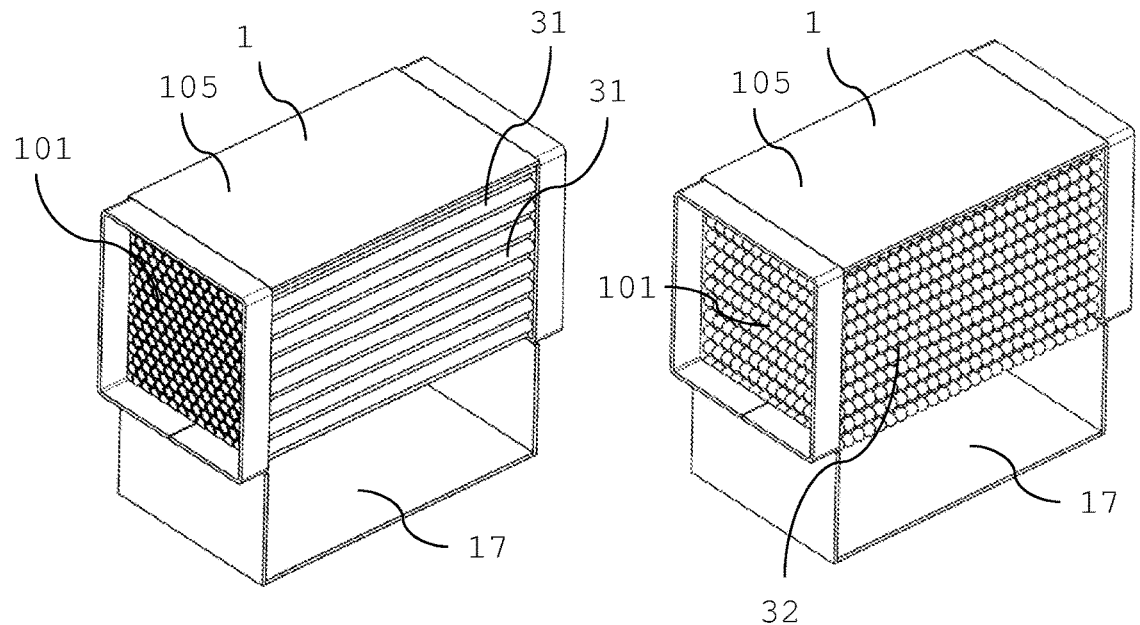
FIG. 3 shows a titanium catalyst with an array of titanium tubes.
FIG. 4 shows a titanium catalyst with a chamber of the body filled with an array of titanium balls.

In FIG. 3 the catalytic volume of the catalyst 1 is filled with an array of titanium tubes 31 arranged in parallel. Only the top wall 105 of the catalytic chamber 100 enclosing the catalytic volume is shown (the top wall 105 also corresponding to the top wall of the body 10). The tubes 31 are arranged parallel to the hot gas main flow direction 3. The hot gas inlet 101 of the catalyst 1 is arranged at the inlets of the tubes 31. Hot gas entering the catalyst passes through the tubes as well as through the space in between the tubes 31. The hot gas leaves the catalyst 1 at the outlets of the tubes 31.

In FIG. 4 a catalytic chamber 100 of the body 10 is filled with titanium balls 32. The balls 32 have a same size and are arranged in a closed packed arrangement, for example according to a hexagonal closed packing or cubic close packing. The balls comprise or are made of metallic titanium or a titanium alloy and have a titanium oxide surface layer, which surface layer forms at the latest during use of the titanium catalyst.

Figure 5:
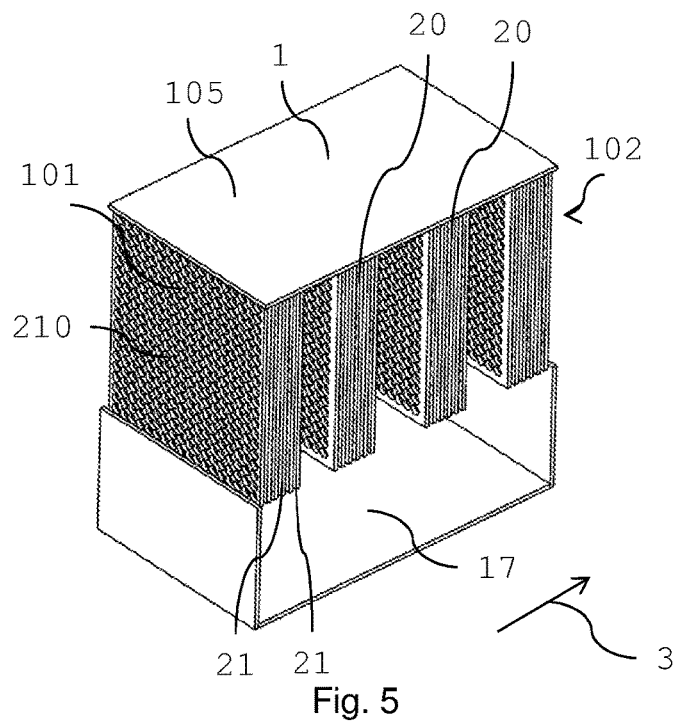
FIG. 5 shows a titanium catalyst with an arrangement of perforated titanium plates.

FIG. 5 shows an arrangement of four partial stacks 20 arranged in the catalytic chamber 100 of the body 10 of the catalyst 1. Each partial stack 20 is formed by six perforated titanium plates 21. The plates 21 are arranged parallel to each other and perpendicular to the hot gas main flow direction 3 such that the gas passes through the perforations or holes 210 in the plates 21. Preferably, the perforations 210 are arranged in a regular manner in the plates 21. Preferably, the perforations 210 of neighboring plates 21 in a partial stack 20 are displaced with respect to each other. By this displacement the gas flow is made to change direction between neighboring plates and is made to pass over the titanium oxide surfaces of the plates. As in the example of FIG. 4, the hot gas does not always flow in the main flow direction 3 in the catalytic chamber but up to perpendicular to the main flow direction 3. By this, the total contact area of hot gas with a catalytic surface may be enhanced.

In FIG. 5 gaps between the partial stacks 20 have different sizes, however, the gaps may also all have a same size. In a variant of the embodiment of the catalyst shown in FIG. 5, a plurality of perforated plates is arranged at equal distances over the entire catalytic volume (or length) of the catalyst not forming partial stacks.

Some exemplary data for a titanium catalyst according to the invention and the titanium catalyst provided in an energy production and conversion system are:

Thickness of corrugated titanium containing sheet: 0.2 millimeter to 0.6 millimeter, for example 0.5 millimeter; height of the corrugations (peak to peak): 1.5 millimeter;

Operating hours of the catalyst: about 40,000 hours; renewed titanium surface about every 1,000 hours for pure titanium catalytic elements, about every 5,000 to 20,000 hours for catalytic elements made of titanium alloy.

Experiments have shown that a titanium catalyst having a surface area between 25 percent and 100 percent of the surface area of a heat exchanger coupled to the catalyst can store all Cr(VI) from the heat exchanger during 20,000 hours to 40,000 hours of operation. Therein, the catalyst is operating at hot gas temperatures of the heat exchanger of between 700 degree Celsius and 900 degree Celsius.

For example, a heat exchanger for a SOFC system for domestic use (about 1 to 3 kW power) produces 6 gram Cr(VI) in 20,000 hours or 12 gram in 40,000 hours. The heat exchanger has a surface area of typically 0.5 to 1 square meter. For example, the titanium catalyst may have 30 corrugated plates of 0.2 to 0.5 mm thickness and size of 8 cm×8 cm and can capture and store 6 gram in 20,000 hours. Typically, 12 gram can be captured and stored during 40,000 hours if part of the $TiO_2$ flakes off.

The invention claimed is:

1. High temperature titanium-catalyst, comprising a body, the body having a hot gas inlet and a hot gas outlet, the body comprising an array of metallic titanium containing catalytic elements, wherein the array of metallic titanium containing catalytic elements is arranged such that hot gas containing an amount of hexavalent chromium Cr(VI) may enter the body at the hot gas inlet, may pass through the array of metallic titanium containing catalytic elements and may leave the body at the hot gas outlet, and wherein when the titanium-catalyst is in use, Cr(VI) in the hot gas containing an amount of Cr(VI) reacts with titanium oxide in a surface layer of the metallic titanium containing catalytic elements, the titanium oxide surface layer being automatically formed upon operation of the catalyst, whereby the Cr(VI) is reduced to trivalent chromium Cr(III) thus reducing the amount of Cr(VI) in the hot gas containing an amount of Cr(VI); wherein the catalytic elements are made of pure metallic titanium or of a titanium alloy, wherein the array of metallic titanium containing catalytic elements is a plurality of corrugated plates adjacently arranged in parallel, wherein corrugations of neighboring plates are tilted against each other;

the high temperature titanium catalyst further comprising a cavity for collecting flakes, the flakes being portions of a surface layer having spalled from the metallic titanium containing catalytic element being made of pure metallic titanium or of a titanium alloy.

2. Catalyst according to claim 1, wherein the catalytic elements contain at least 70 percent metallic titanium.

3. Catalyst according to claim 1, wherein the catalytic elements are made of corrugated sheet material.

4. System comprising a catalyst according to claim 1, wherein the hot gas inlet of the catalyst is connected to a heat exchanger or wherein the hot gas outlet of the catalyst is connected to a fuel cell system or wherein the hot gas inlet of the catalyst is connected to a heat exchanger and the hot gas outlet of the catalyst is connected to a fuel cell system.

5. Catalyst according to claim 1, wherein a tilting angle between corrugations of neighboring catalytic elements is between 5 degrees and 90 degrees.

6. Catalyst according to claim 1, wherein the cavity is arranged underneath the array of metallic titanium containing catalytic elements.

7. Catalyst according to claim 1, wherein the cavity is arranged underneath the array of metallic titanium containing catalytic elements such that flakes may fall into the cavity by gravitational force.

8. Catalyst according to claim 1, the cavity serving as collection tray for the flakes.

9. Catalyst according to claim 1, wherein the cavity is incorporated into the body of the catalyst.

10. Catalyst according to claim 1, wherein the cavity extends over the length of the plates.

11. Catalyst according to claim 6, wherein the cavity extends over the length of the plates.

12. Catalyst according to claim 6, wherein the cavity further extends to the hot gas outlet.

13. Catalyst according to claim 6, wherein the catalytic elements are made of pure metallic titanium or of a titanium alloy and further comprise a pure titanium oxide surface layer.

14. High temperature titanium-catalyst, comprising a body, the body having a hot gas inlet and a hot gas outlet, the body comprising an array of metallic titanium containing catalytic elements, wherein the array of metallic titanium containing catalytic elements is arranged such that hot gas containing an amount of hexavalent chromium Cr(VI) may enter the body at the hot gas inlet, may pass through the array of metallic titanium containing catalytic elements and may leave the body at the hot gas outlet, and wherein when the titanium-catalyst is in use, Cr(VI) in the hot gas containing an amount of Cr(VI) reacts with titanium oxide in a surface layer of the metallic titanium containing catalytic elements, the titanium oxide surface layer being automatically formed upon operation of the catalyst, whereby the Cr(VI) is reduced to trivalent chromium Cr(III) thus reducing the amount of Cr(VI) in the hot gas containing an amount of Cr(VI); wherein the catalytic elements are made of pure metallic titanium or of a titanium alloy, wherein the array of metallic titanium containing catalytic elements is a plurality of corrugated plates arranged in parallel, wherein corrugations of neighboring plates are tilted against each other;

the high temperature titanium catalyst further comprising a cavity for collecting flakes, the flakes being portions of a surface layer having spalled from the metallic titanium containing catalytic element being made of pure metallic titanium or of a titanium alloy, wherein the cavity is arranged underneath the array of metallic titanium containing catalytic elements.

15. Catalyst according to claim 14, wherein the cavity is arranged underneath the array of metallic titanium containing catalytic elements such that flakes may fall into the cavity by gravitational force.

16. Catalyst according to claim 14, the cavity serving as collection tray for the flakes.

17. Catalyst according to claim 14, wherein the cavity is incorporated into the body of the catalyst.

18. Catalyst according to claim 14, wherein the cavity extends over the length of the plates.

19. Catalyst according to claim 14, wherein the cavity further extends to the hot gas outlet.

20. Catalyst according to claim 14, wherein the catalytic elements are made of pure metallic titanium or of a titanium alloy and further comprise a pure titanium oxide surface layer.

* * * * *